United States Patent
Garrido Lopez et al.

(10) Patent No.: US 10,193,597 B1
(45) Date of Patent: Jan. 29, 2019

(54) ELECTRONIC DEVICE HAVING SLOTS FOR HANDLING NEAR-FIELD COMMUNICATIONS AND NON-NEAR-FIELD COMMUNICATIONS

(71) Applicant: Apple Inc., Cupertino, CA (US)

(72) Inventors: David Garrido Lopez, Campbell, CA (US); Umar Azad, Santa Clara, CA (US); Harish Rajagopalan, San Jose, CA (US); Georgios Atmatzakis, Cupertino, CA (US); Rodney A. Gomez Angulo, Santa Clara, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/900,407

(22) Filed: Feb. 20, 2018

(51) Int. Cl.
   *H04B 5/00* (2006.01)
   *H04B 1/00* (2006.01)
   *H04B 1/38* (2015.01)
   *H04B 7/0413* (2017.01)
   *H04W 88/02* (2009.01)

(52) U.S. Cl.
   CPC ............. *H04B 5/0081* (2013.01); *H04B 1/38* (2013.01); *H04B 7/0413* (2013.01); *H04W 88/02* (2013.01)

(58) Field of Classification Search
   CPC ...... H04B 5/0081; H04B 5/0087; H04B 1/38; H04B 7/0413; H04B 1/0064; H04B 7/04; H04B 7/0608; H04B 1/03; H04W 88/02
   See application file for complete search history.

(56) References Cited

U.S. PATENT DOCUMENTS

| | | | |
|---|---|---|---|
| 9,160,056 B2 * | 10/2015 | Nickel | ................... H01Q 1/243 |
| 9,325,080 B2 | 4/2016 | Ouyang et al. | |
| 9,621,230 B2 | 4/2017 | Ouyang et al. | |
| 9,793,616 B2 | 10/2017 | Ouyang et al. | |
| 2002/0196191 A1 * | 12/2002 | Ngounou Kouam .. | H01Q 1/243 343/700 MS |
| 2006/0202898 A1 * | 9/2006 | Li | ........................ H01Q 1/1271 343/713 |

(Continued)

OTHER PUBLICATIONS

Umar Azad et al. U.S. Appl. No. 14/693,274, filed Apr. 22, 2015.

(Continued)

*Primary Examiner* — Andrew Wendell
(74) *Attorney, Agent, or Firm* — Treyz Law Group, P.C.; Michael H. Lyons

(57) ABSTRACT

An electronic device may be provided with a conductive wall. A gap in the wall may divide the wall into first and second segments. A ground may be separated from the wall by first, second, and third slots that form radiating elements for first, second, and third non-near-field communications antennas. First and second conductive structures may be coupled between the wall and the ground. A near-field communications antenna may include a first feed terminal coupled to the first segment and a second feed terminal coupled to the second segment. The antenna may convey signals over a conductive loop path that includes portions of the first and second segments, the antenna ground, and the first and second conductive structures. A differential or single-ended signal transmission line may be coupled to the terminals. Phase shifters may configure the signals to be out of phase at the feed terminals.

20 Claims, 7 Drawing Sheets

(56) References Cited

U.S. PATENT DOCUMENTS

| | | | | |
|---|---|---|---|---|
| 2012/0178503 A1* | 7/2012 | Merz | ............... | H01Q 1/2266 |
| | | | | 455/566 |
| 2015/0249292 A1* | 9/2015 | Ouyang | ............ | H01Q 21/30 |
| | | | | 343/702 |
| 2015/0303568 A1* | 10/2015 | Yarga | ............... | H01Q 5/321 |
| | | | | 343/720 |
| 2015/0372656 A1* | 12/2015 | Mow | ............... | H03H 7/38 |
| | | | | 455/77 |
| 2016/0072539 A1* | 3/2016 | Hu | ............... | H04B 1/3888 |
| | | | | 455/575.8 |
| 2016/0112219 A1 | 4/2016 | Lee et al. | | |
| 2016/0297401 A1 | 10/2016 | Ouyang et al. | | |
| 2016/0308271 A1* | 10/2016 | Jin | ............... | H01Q 1/243 |
| 2016/0309007 A1* | 10/2016 | Irci | ............... | H04B 1/3888 |
| 2016/0315373 A1* | 10/2016 | Azad | ............... | H01Q 1/243 |
| 2017/0264721 A1 | 9/2017 | Yli-Peltola | | |

OTHER PUBLICATIONS

Erdinc Irci et al. U.S. Appl. No. 15/719,317, filed Sep. 28, 2017.
Harish Rajagopalan et al. U.S. Appl. No. 15/716,363, filed Sep. 26, 2017.
Harish Rajagopalan et al. U.S. Appl. No. 15/717,367, filed Sep. 27, 2017.

* cited by examiner

ELECTRONIC DEVICE HAVING SLOTS FOR HANDLING NEAR-FIELD COMMUNICATIONS AND NON-NEAR-FIELD COMMUNICATIONS

BACKGROUND

This relates to electronic devices, and more particularly, to antennas for electronic devices with wireless communications circuitry.

Electronic devices such as portable computers and cellular telephones are often provided with wireless communications capabilities. For example, electronic devices may use long-range wireless communications circuitry such as cellular telephone circuitry to communicate using cellular telephone bands. Electronic devices may use short-range wireless communications circuitry such as wireless local area network communications circuitry to handle communications with nearby equipment. Electronic devices may also be provided with satellite navigation system receivers and other wireless circuitry such as near-field communications circuitry. Near-field communications schemes involve electromagnetically coupled communications over short distances, typically 20 cm or less.

To satisfy consumer demand for small form factor wireless devices, manufacturers are continually striving to implement wireless communications circuitry such as antenna components using compact structures. At the same time, there is a desire for wireless devices to cover a growing number of communications bands. For example, it may be desirable for a wireless device to cover a near-field communications band while simultaneously covering additional non-near-field (far-field) bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies and with a satisfactory efficiency bandwidth.

It would therefore be desirable to be able to provide improved wireless communications circuitry for wireless electronic devices.

SUMMARY

An electronic device may be provided with wireless circuitry and a housing having a peripheral conductive wall. The wireless circuitry may include non-near-field communications antennas coupled to non-near-field communications transceiver circuitry. The non-near-field communications antennas may handle non-near-field communications signals such as cellular telephone signals. The wireless circuitry may include a near-field communications antenna coupled to near-field communications circuitry. The near-field communications antenna may handle near-field communications signals such as radio-frequency signals at 13.56 MHz.

A dielectric-filled gap in the peripheral conductive wall may divide the peripheral conductive wall into first and second segments. The wireless circuitry may include an antenna ground separated from the peripheral conductive wall by first, second, and third slots. A first conductive structure may be coupled between the first segment and the antenna ground and may separate the first slot from the second slot. A second conductive structure may be coupled between the second segment and the antenna ground and may separate the second slot from the third slot. The first, second, and third slots may form radiating elements for respective first, second, and third non-near-field communications antennas. The first, second, and third non-near-field communications antennas may each include antenna feeds that are coupled across the respective first, second, and third slots and that are coupled to the non-near-field communications circuitry.

The near-field communications antenna may be formed from a conductive loop path extending between first and second antenna feed terminals. The first antenna feed terminal may be coupled to the first segment adjacent to the dielectric-filled gap. The second antenna feed terminal may be coupled to the second segment adjacent to the dielectric-filled gap. The conductive loop path may include a portion of the second segment extending from the second antenna feed terminal to the second conductive structure, the second conductive structure, a portion of the antenna ground extending between the first and second conductive structures, the first conductive structure, and a portion of the first segment extending from the first conductive structure to the first antenna feed terminal. The first and second antenna feed terminals may be coupled to the near-field communications transceiver circuitry over a transmission line path.

The transmission line path may include a single-ended signal transmission line path having a ground conductor coupled to the first antenna feed terminal and a signal conductor coupled to the second antenna feed terminal. An inductor may be interposed on the signal conductor. In another suitable arrangement, the transmission line path may include a differential signal transmission line path having a first conductor coupled to the first antenna feed terminal and a second conductor coupled to the second antenna feed terminal. Phase shifter circuitry may be formed within the near-field communications transceiver circuitry or on the transmission line path. The phase shifter circuitry may apply one or more phase shifts to the near-field communications signals so that the near-field communications signals at the first antenna feed terminal are out of phase with respect to the near-field communications signals at the second antenna feed terminal. This may, for example, minimize magnetic field cancellation associated with the near-field communications signals at opposing sides of the dielectric-filled gap, thereby optimizing antenna efficiency for the near-field communications antenna.

DETAILED DESCRIPTION

Figure 1:
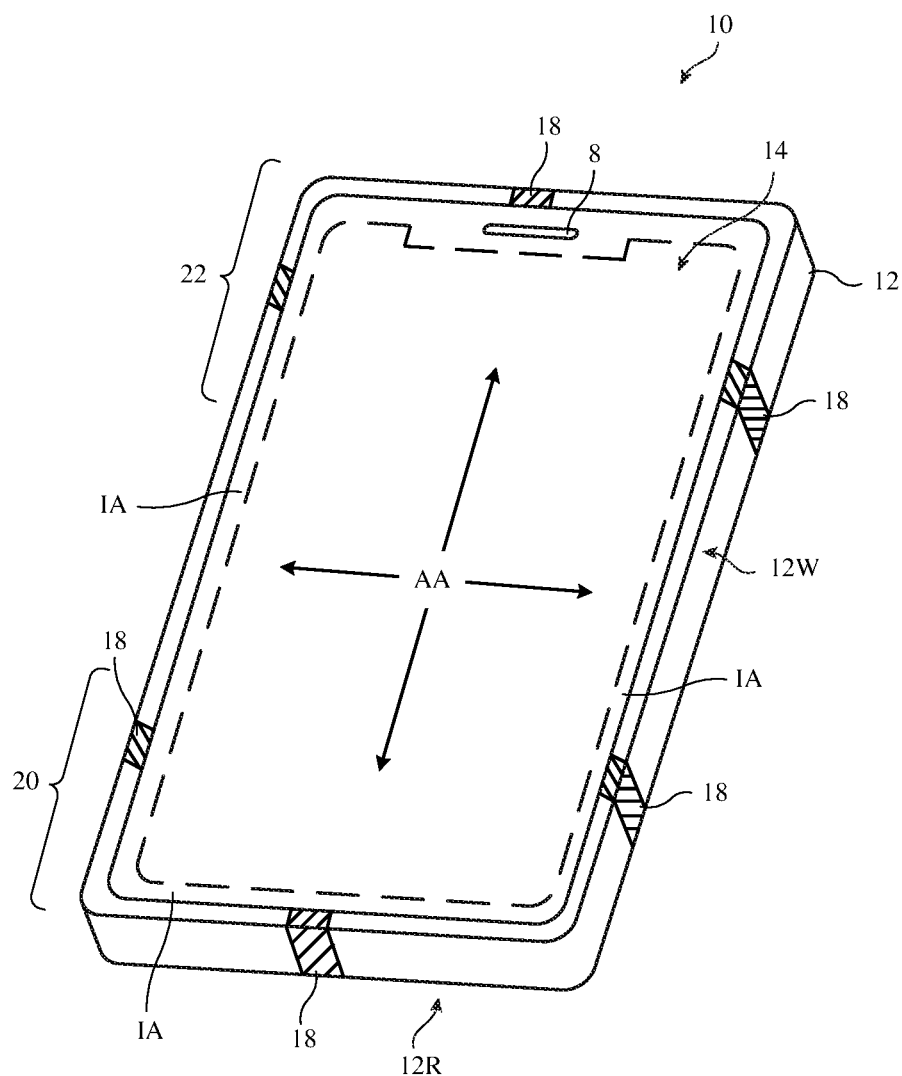
FIG. 1 is a perspective view of an illustrative electronic device in accordance with an embodiment.

Electronic devices such as electronic device 10 of FIG. 1 may be provided with wireless communications circuitry. The wireless communications circuitry may be used to support wireless communications in multiple wireless communications bands.

The wireless communications circuitry may include antenna structures. The antenna structures may include antennas for cellular telephone communications and/or other far-field (non-near-field) communications. Circuitry in the antenna structures may allow the antenna structures to form a near-field communications loop antenna to handle near-field communications. The antenna structures may include loop antenna structures, inverted-F antenna structures, strip antenna structures, planar inverted-F antenna structures, slot antenna structures, hybrid antenna structures that include antenna structures of more than one type, or other suitable antenna structures. Conductive structures for the antenna structures may, if desired, be formed from conductive electronic device structures.

The conductive electronic device structures may include conductive housing structures. The housing structures may include peripheral structures such as peripheral conductive structures that run around the periphery of the electronic device. The peripheral conductive structures may serve as a bezel for a planar structure such as a display, may serve as sidewall structures for a device housing, may have portions that extend upwards from an integral planar rear housing (e.g., to form vertical planar sidewalls or curved sidewalls), and/or may form other housing structures.

Gaps may be formed in the peripheral conductive structures that divide the peripheral conductive structures into peripheral segments. One or more of the segments may be used in forming one or more antennas for electronic device 10. Antennas may also be formed using an antenna ground plane and/or an antenna resonating element formed from conductive housing structures (e.g., internal and/or external structures, support plate structures, etc.).

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic. Housing 12 may also have shallow grooves that do not pass entirely through housing 12. The slots and grooves may be filled with plastic or other dielectric. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Peripheral structures 12W and rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral housing structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding lip that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

If desired, rear housing wall 12R may be formed from a metal such as stainless steel or aluminum and may sometimes be referred to herein as conductive rear housing wall 12R or conductive rear wall 12R. Conductive rear housing wall 12R may lie in a plane that is parallel to display 14. In configurations for device 10 in which rear housing wall 12R is formed from metal, it may be desirable to form parts of peripheral conductive housing structures 12W as integral portions of the housing structures forming the conductive rear housing wall of housing 12. For example, conductive rear housing wall 12R of device 10 may be formed from a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Conductive rear housing wall 12R may have one or more, two or more, or three or more portions. Peripheral conductive housing structures 12W and/or the conductive rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide structures 12W and/or 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA may be free of pixels for displaying images and may overlap circuitry and other internal device structures in housing 12. To block these structures from view by a user of device 10, the underside of the display cover layer or other layers in display 14 that overlaps inactive area IA may be coated with an opaque masking layer in inactive area IA. The opaque masking layer may have any suitable color.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 8 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a backplate) that spans the walls of housing 12 (i.e., a substantially rectangular sheet formed from one or more metal parts that is welded or otherwise connected between opposing sides of member 16). The backplate may form an exterior rear surface of device 10 or may be covered by layers such as thin cosmetic layers, protective coatings, and/or other coatings that may include dielectric materials such as glass, ceramic, plastic, or other structures that form the exterior surfaces of device 10 and/or serve to hide the backplate from view of the user. Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of conductive rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 20 and 22. If desired, the ground plane that is under active area AA of display 14 and/or other metal structures in device 10 may have portions that extend into parts of the ends of device 10 (e.g., the ground may extend towards the dielectric-filled openings in regions 20 and 22), thereby narrowing the slots in regions 20 and 22.

In general, device 10 may include any suitable number of antennas (e.g., one or more, two or more, three or more, four or more, etc.). The antennas in device 10 may be located at opposing first and second ends of an elongated device housing (e.g., at ends 20 and 22 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. There may be, for example, two peripheral conductive segments in peripheral conductive housing structures 12W (e.g., in an arrangement with two of gaps 18), three peripheral conductive segments (e.g., in an arrangement with three of gaps 18), four peripheral conductive segments (e.g., in an arrangement with four of gaps 18), six peripheral conductive segments (e.g., in an arrangement with six gaps 18), etc. The segments of peripheral conductive housing structures 12W that are formed in this way may form parts of antennas in device 10.

If desired, openings in housing 12 such as grooves that extend partway or completely through housing 12 may extend across the width of the rear wall of housing 12 and may penetrate through the rear wall of housing 12 to divide the rear wall into different portions. These grooves may also extend into peripheral conductive housing structures 12W and may form antenna slots, gaps 18, and other structures in device 10. Polymer or other dielectric may fill these grooves and other housing openings. In some situations, housing openings that form antenna slots and other structure may be filled with a dielectric such as air.

In a typical scenario, device 10 may have one or more upper antennas and one or more lower antennas (as an example). An upper antenna may, for example, be formed at the upper end of device 10 in region 22. A lower antenna may, for example, be formed at the lower end of device 10 in region 20. The antennas may be used separately to cover identical communications bands, overlapping communications bands, or separate communications bands. The antennas may be used to implement an antenna diversity scheme or a multiple-input-multiple-output (MIMO) antenna scheme.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, near-field communications, etc.

In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area of regions 20 and 22 that is available for forming antennas within device 10. In general, antennas that are provided with larger operating volumes or spaces may have higher bandwidth efficiency than antennas that are provided with smaller operating volumes or spaces. If care is not taken, increasing the size of active area AA may reduce the operating space available to the antennas, which can undesirably inhibit the efficiency bandwidth of the antennas (e.g., such that the antennas no longer exhibit satisfactory radio-frequency performance). It would therefore be desirable to be able to provide antennas that occupy a small amount of space within device 10 (e.g., to allow for as large of a display active area AA as possible) while still allowing the antennas to operate with optimal efficiency bandwidth.

Figure 2:
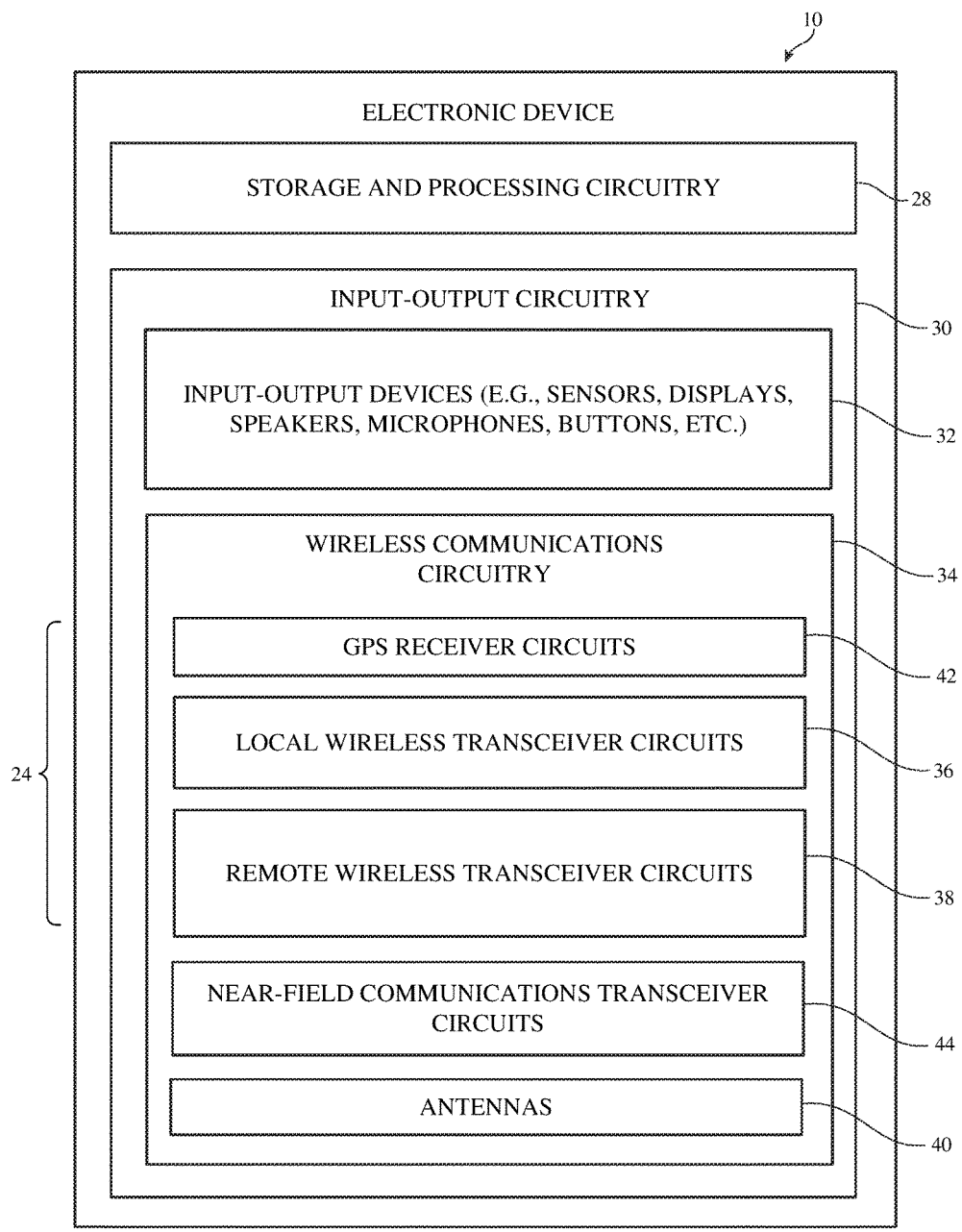
FIG. 2 is a schematic diagram of illustrative circuitry in an electronic device in accordance with an embodiment.

A schematic diagram showing illustrative components that may be used in device 10 of FIG. 1 is shown in FIG. 2. As shown in FIG. 2, device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as Wi-Fi®), protocols for other short-range wireless communications links such as the Bluetooth® protocol or other wireless personal area network protocols, cellular telephone protocols, multiple-input and multiple-output (MIMO) protocols, antenna diversity protocols, near-field communications (NFC) protocols, etc.

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, joysticks, scrolling wheels, touch pads, key pads, keyboards, microphones, cameras, buttons, speakers, status indicators, light sources, audio jacks and other audio port components, digital data port devices, light sensors, position and orientation sensors (e.g., sensors such as accelerometers, gyroscopes, and compasses), capacitance sensors, proximity sensors (e.g., capacitive proximity sensors, light-based proximity sensors, etc.), fingerprint sensors (e.g., a fingerprint sensor integrated with a button), etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 24 for handling various radio-frequency communications bands. For example, circuitry 34 may include transceiver circuitry 36, 38, and 42. Transceiver circuitry 36 may handle wireless local area network (WLAN) bands such as 2.4 GHz and 5 GHz bands for WiFi® (IEEE 802.11) communications and/or wireless personal area network (WPAN) bands such as the 2.4 GHz Bluetooth® communications band. Circuitry 34 may use cellular telephone transceiver circuitry 38 for handling wireless communications in frequency ranges such as a low communications band from 700 to 960 MHz, a low-midband from 960 to 1710 MHz, a midband from 1710 to 2170 MHz, a high band from 2300 to 2700 MHz, an ultra-high band from 3400 to 3700 MHz or other communications bands between 600 MHz and 4000 MHz or other suitable frequencies (as examples).

Circuitry 38 may handle voice data and non-voice data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, etc. Wireless communications circuitry 34 may include global positioning system (GPS) receiver equipment such as GPS receiver circuitry 42 for receiving GPS signals at 1575 MHz or for handling other satellite positioning data (e.g., Global Navigation Satellite System (GLONASS) signals, etc.). In Wi-Fi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless circuitry 34 may include near-field communications circuitry 44 (sometimes referred to herein as near-field communications transceiver circuitry 44, near-field communications transceiver circuits 44, near-field communications transceiver 44, near-field circuitry 44, near-field transceiver circuitry 44, or near-field transceiver 44). Near-field communications transceiver circuitry 44 may produce and receive near-field communications signals to support communications between device 10 and a near-field communications reader or other external near-field communications equipment. Near-field communications may be supported using loop antennas (e.g., to support inductive near-field communications in which a loop antenna in device 10 is electromagnetically near-field coupled to a corresponding loop antenna in a near-field communications reader). Near-field communications links typically are formed over distances of 20 cm or less (i.e., device 10 must be placed in the vicinity of the near-field communications reader for effective communications).

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of these designs, etc. Different types of antennas may be used for different bands and combinations of bands. For example, one type of antenna may be used in forming a local wireless link antenna and another type of antenna may be used in forming a remote wireless link antenna. In addition to supporting cellular telephone communications, wireless local area network communications, and other far-field wireless communications, the structures of antennas 40 may be used in supporting near-field communications. The structures of antennas 40 may also be used in gathering proximity sensor signals (e.g., capacitive proximity sensor signals).

Radio-frequency transceiver circuitry 24 does not handle near-field communications signals and is therefore sometimes referred to as far-field communications circuitry, non-near-field communications circuitry, non-near-field circuitry, or non-near-field communications transceiver circuitry. Near-field communications transceiver circuitry 44 is used in handling near-field communications. With one suitable arrangement, near-field communications can be supported using signals at a frequency of 13.56 MHz or other frequencies below 600 MHz. Other near-field communications bands may be supported using the structures of antennas 40 if desired. Frequencies handled by near-field communications transceiver circuitry 44 in performing near-field communications using wireless near-field communications signals may sometimes be referred to herein as near-field communications frequencies. Transceiver circuitry 90 may handle non-near-field communications frequencies (e.g., frequencies above 600 MHz or other suitable frequencies).

Figure 3:
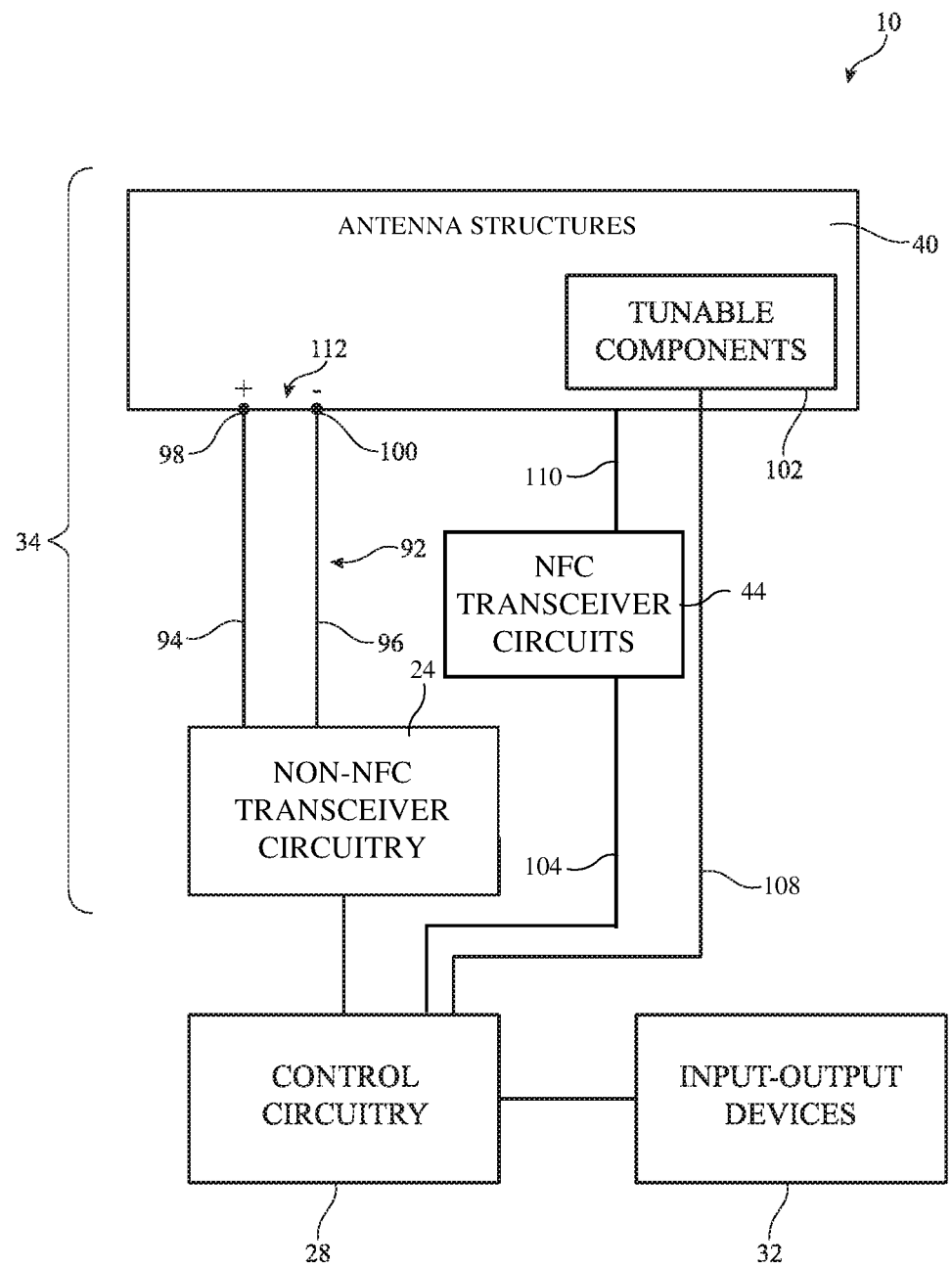
FIG. 3 is a schematic diagram of illustrative wireless communications circuitry in accordance with an embodiment.

The structures forming antennas 40 may sometimes be collectively referred to herein as antenna structures 40. As shown in FIG. 3, antenna structures 40 may be coupled to near-field communications circuitry such as near-field communications transceiver circuitry 44 and non-near-field communications circuitry such as non-near-field communications transceiver circuitry 24.

Non-near-field communications transceiver circuitry 24 in wireless communications circuitry 34 may be coupled to antenna structures 40 using paths such as path 92. Near-field communications transceiver circuitry 44 may be coupled to antenna structures 40 using paths such as path 110. Paths such as path 104 may be used to allow control circuitry 28 to transmit near-field communications data and to receive near-field communications data using near-field transceiver circuitry 44 and a near-field communications antenna formed from structures 40.

Control circuitry 28 may be coupled to input-output devices 32. Input-output devices 32 may supply output from device 10 and may receive input from sources that are external to device 10.

To provide antenna structures such as antenna(s) 40 with the ability to cover communications frequencies of interest, antenna(s) 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna(s) 40 may be provided with adjustable circuits such as tunable components 102 to tune antennas over communications bands of interest. Tunable components 102 may be part of a tunable filter or tunable impedance matching network, may be part of an antenna resonating element, may span a gap between an antenna resonating element and antenna ground, etc.

Tunable components 102 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures. During operation of device 10, control circuitry 28 may issue control signals on one or more paths such as path 108 that adjust inductance values, capacitance values, or other parameters associated with tunable components 102, thereby tuning antenna structures 40 to cover desired communications bands.

During operation of device 10, control circuitry 28 may issue control signals on one or more paths such as path 108 that adjust inductance values, capacitance values, or other parameters associated with tunable components 102, thereby tuning antenna structures 40 to cover desired communications bands. Active and/or passive components may also be used to allow antenna structures 40 to be shared between non-near-field communications transceiver circuitry 24 and near-field communications transceiver circuitry 44. Near-field communications and non-near-field communications may also be handled using two or more separate antennas, if desired.

Path 92 may include one or more transmission lines. As an example, path 92 of FIG. 3 may be a radio-frequency transmission line having a positive signal conductor such as conductor 94 and a ground signal conductor such as conductor 96. Transmission line structures used to form path 92 (sometimes referred to herein as transmission lines 92 or radio-frequency transmission lines 92) may include parts of a coaxial cable, a stripline transmission line, microstrip transmission line, coaxial probes realized by metalized vias, edge-coupled microstrip transmission lines, edge-coupled stripline transmission lines, waveguide structures, transmission lines formed from combinations of transmission lines of these types, etc.

Transmission lines in device 10 may be integrated into rigid and/or flexible printed circuit boards. In one suitable arrangement, transmission lines in device 10 may also include transmission line conductors (e.g., signal and ground conductors) integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

A matching network (e.g., an adjustable matching network formed using tunable components 102) may include components such as inductors, resistors, and capacitors used in matching the impedance of antenna(s) 40 to the impedance of transmission line 92. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Transmission line 92 may be coupled to antenna feed structures associated with antenna structures 40. As an example, antenna structures 40 may form an inverted-F antenna, a slot antenna, a hybrid inverted-F slot antenna or other antenna having an antenna feed 112 with a positive antenna feed terminal such as terminal 98 and a ground antenna feed terminal such as ground antenna feed terminal 100. Positive transmission line conductor 94 may be coupled to positive antenna feed terminal 98 and ground transmission line conductor 96 may be coupled to ground antenna feed terminal 100. Other types of antenna feed arrangements may be used if desired. For example, antenna structures 40 may be fed using multiple feeds.

Path 110 may include transmission line structures or other conductive lines that couple near-field communications transceiver circuitry 44 to near-field communications antenna feed terminals of a near-field communications antenna feed on antenna structures 40. The near-field communications antenna feed may be formed using antenna feed 112 or may be formed separately from antenna feed 112. Path 110 (sometimes referred to herein as radio-frequency transmission line 110, transmission line 110, or transmission line path 110) may, for example, include a single-ended signal path for conveying single-ended near-field communications antenna signals between near-field communications transceiver circuitry 44 and antenna structures 40. In another suitable arrangement, path 110 may include a differential signal path for conveying differential near-field communications antenna signals between near-field communications transceiver circuitry 44 and antenna structures 40. The illustrative feeding configuration of FIG. 3 is merely illustrative.

If desired, control circuitry 28 may use an impedance measurement circuit to gather antenna impedance information. Control circuitry 28 may use information from a proximity sensor (see, e.g., sensors 32 of FIG. 2), received signal strength information, device orientation information from an orientation sensor, information about a usage scenario of device 10, information about whether audio is being played through speaker 8 (FIG. 1), information from one or more antenna impedance sensors, or other information in determining when antenna structures 40 are being affected by the presence of nearby external objects or is otherwise in need of tuning. In response, control circuitry 28 may adjust an adjustable inductor, adjustable capacitor, switch, or other tunable component 102 to ensure that antenna structures 40 operate as desired. Adjustments to tunable components 102 may also be made to extend the coverage of antenna structures 40 (e.g., to cover desired communications bands that extend over a range of frequencies larger than the antenna structures would cover without tuning).

Antenna structures 40 may include resonating element structures (sometimes referred to herein as radiating element structures), antenna ground plane structures (sometimes referred to herein as ground plane structures, ground structures, or antenna ground structures), an antenna feed such as antenna feed 112 and a near-field communications antenna feed, and other components (e.g., tunable components 102). Antenna structures 40 may be configured to form any suitable types of antennas. With one suitable arrangement, which is sometimes described herein as an example, antenna structures 40 may be used to implement a slot antenna structure.

Figure 4:
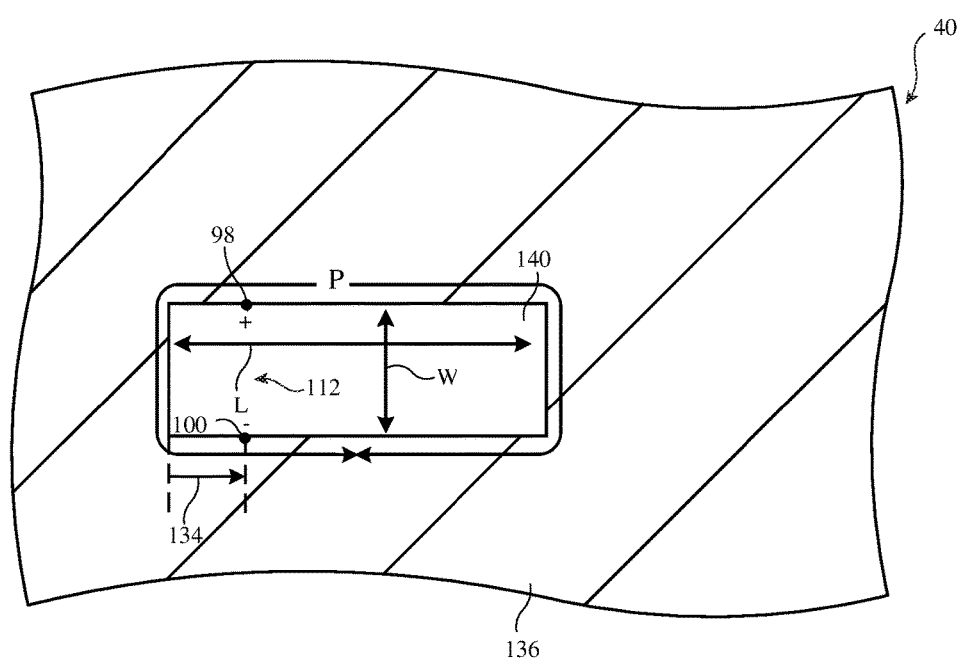
FIG. 4 is a diagram of illustrative slot antenna structures in accordance with an embodiment.

An illustrative slot antenna structure that may be used for forming antenna structures 40 is shown in FIG. 4. As shown in FIG. 4, antenna structures 40 may include a conductive structure such as structure 136 that has been provided with a dielectric-filled opening such as dielectric opening 140. Openings such as opening 140 of FIG. 4 are sometimes referred to as slots, slot elements, slot resonating elements, or slot antenna resonating elements of antenna structures 40. In the configuration of FIG. 4, slot 140 is a closed slot, because portions of conductive structure 136 completely surround and enclose slot 140. Open slot antenna structures may also be formed in conductive materials such as conductive structure 136 (e.g., by forming an opening in the right-hand or left-hand end of conductive structure 136 so that slot 140 protrudes through conductive structure 136).

Antenna feed 112 for antenna structures 40 may be formed using positive antenna feed terminal 98 and ground antenna feed terminal 100. In general, the frequency response of an antenna is related to the size and shapes of the conductive structures in the antenna. Slot antenna structures of the type shown in FIG. 4 tend to exhibit response peaks when slot perimeter P is equal to the wavelength of operation of the antenna (e.g. where perimeter P is equal to two times length L plus two times width W). Antenna currents may flow between feed terminals 98 and 100 around perimeter P of slot 140.

Antenna feed 112 may be coupled across slot 140 at a location along length L. For example, antenna feed 112 may be located at a distance 134 from one side of slot 140. Distance 134 may be adjusted to match the impedance of antenna structures 40 to the impedance of the corresponding transmission line (e.g., transmission line 92 of FIG. 3). For example, the antenna current flowing around slot 140 may experience an impedance of zero at the left and right edges of slot 140 (e.g., a short circuit impedance) and an infinite (open circuit) impedance at the center of slot 140 (e.g., at a fundamental frequency of the slot). Location 134 may be located between the center of slot 140 and the left edge at a location where the antenna current experiences an impedance that matches the impedance of the corresponding transmission line, for example (e.g., distance 134 may be between 0 and ¼ of the wavelength of operation of antenna structures 40). Distance 134 may, for example, be 9 mm, between 5 mm and 10 mm, between 2 mm and 12 mm, or any other suitable distance. Slot 140 may have a width W perpendicular to length L.

In scenarios where slot 140 is a closed slot, length L may be approximately equal to (e.g., within 15% of) one half of a wavelength of operation of the antenna (e.g., a wavelength of a fundamental mode of the antenna). Harmonic modes of slot 140 may also be configured to cover desired frequency bands. In scenarios where slot 140 is an open slot, the length of slot element 140 may be approximately equal to one quarter of the wavelength of the antenna. The wavelength of operation may, for example, be an effective wavelength of operation based on the dielectric material within slot 140.

The frequency response of slot 140 can be tuned using one or more tuning components (e.g., tunable components 102 of FIG. 3). These components may have terminals that are coupled to opposing sides of slot 140 (i.e., the tunable components may bridge the slot). If desired, tunable components may have terminals that are coupled to respective locations along the length of one of the sides of slot 140. Combinations of these arrangements may also be used.

The example of FIG. 4 is merely illustrative. In general, slot 140 may have any desired shape (e.g., where the perimeter P of slot 140 defines radiating characteristics of the antenna). For example, slot 140 may have a meandering shape with different segments extending in different directions, may have straight and/or curved edges, may have more than one open end, etc. Conductive structure 136 may be formed from any desired conductive electronic device structures. For example, conductive structure 136 may include conductive traces on printed circuit boards or other substrates, sheet metal, metal foil, conductive structures associated with display 14 (FIG. 1), conductive portions of housing 12 (e.g., conductive structures 12W and/or 12R of FIG. 1), and/or other conductive structures within device 10.

In one suitable arrangement, different sides (edges) of slot 140 may be defined by different conductive structures.

In the example of FIG. 4, a single antenna is shown. When operating using a single antenna, a single stream of wireless data may be conveyed between device 10 and external communications equipment (e.g., one or more other wireless devices such as wireless base stations, access points, cellular telephones, computers, etc.). This may impose an upper limit on the data rate (data throughput) obtainable by wireless communications circuitry 34 in communicating with the external communications equipment. As software applications and other device operations increase in complexity over time, the amount of data that needs to be conveyed between device 10 and the external communications equipment typically increases, such that a single antenna may not be capable of providing sufficient data throughput for handling the desired device operations.

In order to increase the overall data throughput of wireless circuitry 34, multiple antennas may be operated using a multiple-input and multiple-output (MIMO) scheme. When operating using a MIMO scheme, two or more antennas on device 10 may be used to convey multiple independent streams of wireless data at the same frequencies. This may significantly increase the overall data throughput between device 10 and the external communications equipment relative to scenarios where only a single antenna is used. In general, the greater the number of antennas that are used for conveying wireless data under the MIMO scheme, the greater the overall throughput of circuitry 34.

Figure 5:
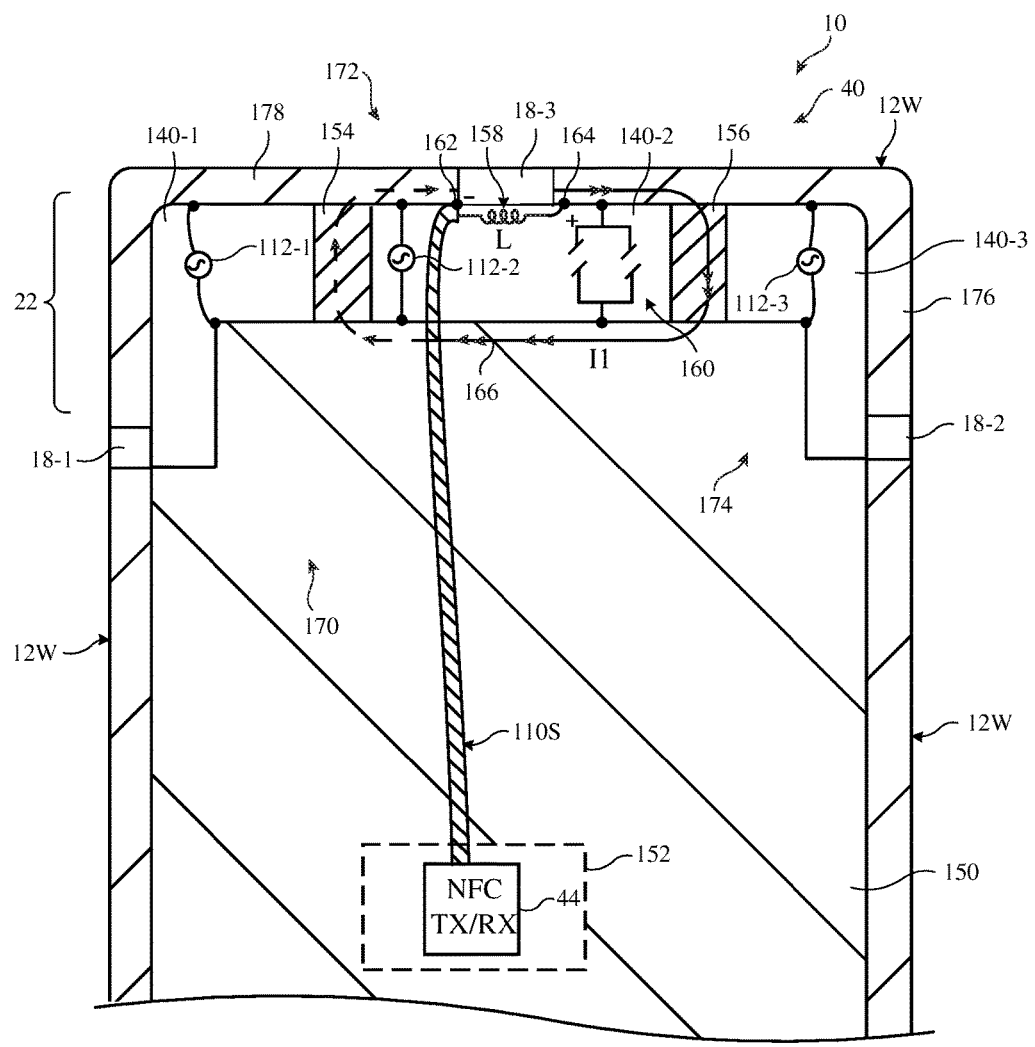
FIG. 5 is a top view of an illustrative electronic device having a slot for performing both near-field communications and non-near-field communications in accordance with an embodiment.

A top interior view of an illustrative device 10 that contains multiple antennas (e.g., for performing communications under a MIMO scheme) is shown in FIG. 5. As shown in FIG. 5, device 10 may have peripheral conductive housing structures such as peripheral conductive housing structures 12W (sometimes referred to herein as peripheral conductive housing sidewalls 12W). In the example of FIG. 5, display 14 is not shown for the sake of clarity.

Peripheral conductive housing sidewalls 12W may be segmented by dielectric-filled gaps (e.g., plastic gaps) 18 such as a first gap 18-1, a second gap 18-2, and a third gap 18-3. Each of gaps 18-1, 18-2, and 18-3 may be formed within peripheral conductive housing sidewalls 12W along respective sides of device 10. Gap 18-1 may separate segment 178 of peripheral conductive housing sidewalls 12W from the segment of peripheral conductive housing sidewalls 12W below gap 18-1. Gap 18-2 may separate segment 176 of peripheral conductive housing sidewalls 12W from the segment of peripheral conductive housing sidewalls 12W below gap 18-2. Gap 18-3 may separate segment 178 from segment 176 of peripheral conductive housing sidewalls 12W. Gaps 18-1, 18-2, and 18-3 may be filled with plastic, ceramic, sapphire, glass, epoxy, or other dielectric materials. The dielectric material in gaps 18-1, 18-2, and 18-3 may lie flush with peripheral conductive housing sidewalls 12W at the exterior surface of device 10 if desired.

A conductive structure such as conductive layer 150 may extend between opposing peripheral conductive housing sidewalls 12W. Conductive layer 150 may be formed from conductive housing structures, conductive structures from electrical device components in device 10, printed circuit board traces, strips of conductor such as strips of wire and metal foil, conductive components in a display (e.g., display 14 of FIG. 1), and/or other conductive structures. In one suitable arrangement, conductive layer 150 is formed from conductive rear wall 12R (FIG. 1).

As shown in FIG. 5, conductive layer 150 (e.g., conductive rear housing wall 12R) may extend between the opposing edges (e.g., the left and right edges) of device 10. Conductive layer 150 may be formed from a separate metal structure from peripheral conductive housing sidewalls 12W or conductive layer 150 and peripheral conductive housing sidewalls 12W may be formed from the same, continuous, integral metal structure (e.g., in a unibody configuration).

In the example of FIG. 5, antenna structures 40 may include multiple antennas such as a first antenna 170, a second antenna 172, and a third antenna 174. Antennas 170, 172, and 174 may, for example, be non-near-field communications antennas for handling non-near-field communications. Antennas 170, 172, and 174 may include an antenna ground (sometimes referred to herein as ground structures or an antenna ground plane) formed from conductive layer 150 and the segments of peripheral conductive housing walls 12W below gaps 18-1 and 18-2, for example.

Antenna 170 may include a first slot 140-1 between segment 178 of peripheral conductive housing sidewalls 12W and conductive layer 150. Antenna 172 may include a second slot 140-2. Second slot 140-2 may have a first edge defined by portions of segments 178 and 176 of peripheral conductive housing sidewalls 12W and gap 18-3 and may have a second opposing edge defined by conductive layer 150. Antenna 174 may include a third slot 140-3 between segment 176 of peripheral conductive housing sidewalls 12W and conductive layer 150 (e.g., conductive layer 150 and peripheral conductive housing sidewalls 12W may form conductive structure 136 of FIG. 4 for antennas 170, 172, and 174).

Conductive bridging structures such as conductive structures 154 may be coupled between segment 178 of peripheral conductive housing sidewalls 12W and conductive layer 150. Conductive structures 154 may electrically isolate slot 140-1 from slot 140-2 (e.g., conductive structures 154 may define edges of slots 140-1 and 140-2). Conductive bridging structures such as conductive structures 156 may be coupled between segment 176 of peripheral conductive housing sidewalls 12W and conductive layer 150. Conductive structures 156 may electrically isolate slot 140-2 from slot 140-3 (e.g., conductive structures 154 may define edges of slots 140-2 and 140-3).

Conductive structures 154 and 156 may, as examples, be formed from metal traces on printed circuits, metal foil, metal members formed from a sheet of metal, conductive portions of housing 12 (e.g., integral portions of conductive rear housing wall 12R and/or peripheral conductive housing sidewalls 12W), conductive wires, conductive portions of input-output devices 32 of FIG. 2 (e.g., conductive portions of display 14, conductive portions of a camera module or light sensor module, conductive portions of a speaker module, etc.), conductive interconnect structures such as conductive pins, conductive brackets, conductive adhesive, solder, welds, conductive springs, conductive screws, or combinations of these and/or other conductive interconnect structures, conductive foam, switchable or fixed inductive paths, switchable or fixed capacitive paths, and/or any other desired conductive components or structures. Conductive structures 154 need not be formed from the same types of conductive components as conductive structures 156.

Slots 140-1, 140-2, and 140-3 may be filled with plastic, glass, sapphire, epoxy, ceramic, or other dielectric material. Slot 140-1 may be continuous with gap 18-1 in peripheral conductive housing sidewalls 12W such that gap 18-1 forms an open end of slot 140-1 (e.g., a single piece of dielectric material may be used to fill both slot 140-1 and gap 18-1). Slot 140-1 may have an opposing closed end 140-1 defined by conductive structures 154. Slot 140-2 may be continuous with gap 18-3 in peripheral conductive housing sidewalls 12W such that gap 18-3 forms an open end of slot 140-2 (e.g., a single piece of dielectric material may be used to fill both slot 140-2 and gap 18-3). Slot 140-2 may have a closed end defined by conductive structures 154. Slot 140-3 may be continuous with gap 18-2 in peripheral conductive housing sidewalls 12W such that gap 18-2 forms an open end of slot 140-3 (e.g., a single piece of dielectric material may be used to fill both slot 140-3 and gap 18-2). Slot 140-3 may have an opposing closed end defined by conductive structures 156.

In one suitable arrangement, slots 140-1, 140-2, and 140-3 may be formed from a single continuous dielectric-filled slot at the exterior of device 10 (e.g., where a single continuous piece of dielectric material is used to fill slots 140-1, 140-2, 140-3, gap 18-1, gap 18-2, and gap 18-3). In this scenario, conductive structures 154 and 156 may be formed at the interior of device 10 and serve to electrically divide the continuous dielectric-filled slot into separate slots 140-1, 140-2, and 140-3 (e.g., at the interior of device 10).

Antenna 170 may be fed using a corresponding antenna feed 112 (FIGS. 3 and 4) such as antenna feed 112-1 coupled across slot 140-1. Antenna 172 may be fed using a corresponding antenna feed 112-2 coupled across slot 140-2. Antenna 174 may be fed using a corresponding antenna feed 112-3 coupled across slot 140-3. Antenna feeds 112-1, 112-2, and 112-3 may be coupled to non-near-field communications transceiver circuitry 24 over corresponding transmission lines 92 (FIG. 3). Antennas 170, 172, and 174 and the corresponding antenna feeds 112-1, 112-2, and 112-3 may handle wireless communications in non-near-field communications frequency bands such as a cellular low band LB, a cellular midband MB, a cellular high band HB, a cellular low-midband from 960 to 1710 MHz, a cellular ultra-high band from 3400 to 3700 MHz, 2.4 GHz and 5 GHz bands for Wi-Fi® (IEEE 802.11) communications, a 1575 MHz band for GPS signals, and/or other non-near-field communications bands. Antennas 170, 172, and 174 may therefore sometimes be referred to herein as non-near-field communications antennas 170, 172, and 174. Antenna feeds 112-1, 112-2, and 112-3 may sometimes be referred to herein as non-near-field communications antenna feeds.

The frequency response of non-near-field communications antenna 170 may be determined by the elongated length of slot 140-1 (e.g., the length of the portion of segment 178 of peripheral conductive housing sidewalls 12W extending from gap 18-1 to conductive structures 154). For example, this elongated length may be approximately equal to one-quarter of the wavelength of operation of non-near-field communications antenna 170 (e.g., a non-near-field communications wavelength). The frequency response of non-near-field communications antenna 172 may be determined by the elongated length of slot 140-2.

If desired, the electrical length of slot 140-2 may be adjusted using a filter or frequency-dependent component such as capacitive circuit 160 (e.g., a network of one or more capacitors coupled in series and/or in parallel). Capacitive circuit 160 may be coupled between segment 176 and conductive layer 150 across slot 140-2. Capacitive circuit 160 may have a selected capacitance so that capacitive circuit 160 forms a short circuit between segment 176 and conductive layer 150 at relatively high frequencies such as non-near-field communications frequencies and so that capacitive circuit 160 forms an open circuit at relatively low frequencies such as near-field communications frequencies. In this way, capacitive circuit 160 may shorten the effective or electrical length of slot 140-2 at relatively high frequencies such as the non-near-field communications frequencies handled by antenna feed 112-2 of non-near-field communications antenna 172. This may configure slot 140-2 to have has closed ends formed by conductive structures 154, conductive layer 150, and capacitive circuit 160 and an open end formed by gap 18-3 at non-near-field communications frequencies (e.g., so that the effective length of slot 140-2 extends from conductive structures 154 to the exterior surface of gap 18-3). This effective length may be selected to be approximately one-quarter of the wavelength of operation of non-near-field communications antenna 172, for example. At the same time, capacitive circuit 160 may allow slot 140-2 to be as electrically large as possible at relatively low frequencies such as near-field communications frequencies.

The frequency response of non-near-field communications antenna 174 may be determined by the elongated length of slot 140-1 extending from conductive structures 156 to gap 18-2 (e.g., the length of segment 176 of peripheral conductive housing sidewalls 12W extending from gap 18-3 to conductive structures 156). For example, this elongated length may be approximately equal to one-quarter of the wavelength of operation of non-near-field communications antenna 174 (e.g., a non-near-field communications wavelength). The elongated lengths of slot 140-1, 140-2, and 140-3 (e.g., length L of FIG. 4) may, if desired, include the vertical height of gaps 18-1, 18-3, and 18-2, respectively (e.g., the lengths of gaps 18-1, 18-3, and 18-2 extending up the vertical height of peripheral conductive housing sidewalls 12W from conductive rear housing wall 12R to display 14 as shown by gaps 18 in FIG. 1).

In the example of FIG. 5, slots 140-1 and 140-3 have meandering shapes that conform to the corners of device 10 whereas slot 140-2 has a rectangular shape that extends parallel to the top edge of device 10). This example is merely illustrative. In general, slots 140-1, 140-2, and 140-3 may be straight or may have any desired shape having any desired number of segments and straight and/or curved edges. While the example of FIG. 5 shows antenna structures 40 formed within region 22 at the upper end of device 10, similar structures may additionally or alternatively be formed within region 20 at the lower end of device 10 if desired (FIG. 1).

In order to enhance the data throughput of wireless circuitry 34, non-near-field communications transceiver circuitry 24 (FIG. 3) may perform communications at non-near-field communications frequencies under a MIMO scheme using non-near-field communications antennas 170, 172, and/or 174. In order to perform MIMO communications, non-near-field communications transceiver circuitry 24 may convey radio-frequency signals at the same frequencies (e.g., in the same frequency band) over non-near-field communications antennas 170, 172, and/or 174. Antenna tuning components (e.g., tunable components 102 of FIG. 3) may be coupled across slots 140-1, 140-2, and/or 140-3 for tuning the non-near-field communications frequency response of non-near-field communications antennas 170, 172, and/or 174, respectively.

To support near-field communications in device 10, device 10 preferably includes a dedicated near-field communications antenna. Space can be conserved by using some or all of antenna structures 40 (e.g., non-near-field communications antennas 170, 172, and/or 174) as both non-near-field communications antennas and as a near-field communications antenna. As an example, a near-field communications antenna for device 10 (e.g., an antenna that is used by near-field communications transceiver circuitry 44) may be formed using portions of antenna structures 40 such as portions of segments 178 and 176 of peripheral conductive housing sidewalls 12W, conductive structures 154 and 156, and conductive layer 150. In the example of FIG. 5, antenna structures 40 include a near-field communications antenna as illustrated by conductive loop path 166 (sometimes referred to herein as near-field communications antenna 166, near-field communications loop antenna 166, or loop antenna 166). By sharing conductive antenna structures between both near-field and non-near-field communications antennas, duplicative conductive structures can be minimized and antenna volume can be conserved within device 10.

As shown in FIG. 5, near-field communications antenna 166 for device 10 may be formed from a portion of non-near-field communications antenna 170 such as conductive structures 154. Near-field communications antenna 166 may be formed from portions of non-near-field communications antenna 172 such as the portions of segments 178 and 176 defining edges of slot 140-2, conductive structures 154, conductive structures 156, and the portion of conductive layer 150 defining edges of slot 140-2. Near-field communications antenna 166 may be formed from a portion of non-near-field communications antenna 174 such as conductive structures 156.

In order to support near-field communications using near-field communications antenna 166, near-field communications transceiver circuitry 44 (NFC TX/RX) may transmit and/or receive near-field communications signals (e.g., radio-frequency signals in a near-field communications band such as a 13.56 MHz near-field communications band). Near-field communications transceiver circuitry 44 may be mounted to a substrate 152 such as a main logic board for device 10. Near-field communications transceiver circuitry 44 may be coupled to near-field communications antenna 166 using a transmission line 110 (FIG. 3) such as transmission line 110S. In the example of FIG. 5, transmission line 110S is a single-ended signal path (sometimes referred to herein as a single-ended signal transmission line) for conveying single-ended near-field communications signals between near-field communications antenna 166 and near-field communications transceiver circuitry 44.

Near-field communications antenna 166 may include a single-ended antenna feed coupled to peripheral conductive housing sidewalls 12W across gap 18-3. The single-ended antenna feed may include a positive antenna feed terminal 164 (sometimes referred to herein as positive near-field communications antenna feed terminal 164) coupled to segment 176 and a ground antenna feed terminal 162 (sometimes referred to herein as ground near-field communications antenna feed terminal 162) coupled to segment 178. Transmission line 110S may include a ground conductor coupled to ground antenna feed terminal 162 and may include a single conductor coupled to positive antenna feed terminal 164. In one suitable arrangement, transmission line 110S may be a coaxial cable having a ground conductor formed from an outer conductive braid surrounding the signal conductor.

If desired, a filter such as a frequency-dependent circuit based on inductor 158 (e.g., an inductor having an inductance L) may be interposed on the signal conductor of transmission line 110S. Inductance L of inductor 158 may be selected so that inductor 158 forms a short circuit path to antenna feed terminal 164 at relatively low frequencies such as near-field communications frequencies and so that inductor 158 forms an open circuit at relatively high frequencies such as non-near-field communications frequencies. In this way, inductor 158 may serve to isolate near-field communications transceiver circuitry 44 from radio-frequency signals at non-near-field communications frequencies handled by antennas 170, 172, and/or 174. In the example of FIG. 5, near-field communications transceiver circuitry 44 may, if desired, include balun circuitry or other circuitry for converting the single-ended signals into differential signals and for converting differential signals into the single-ended signals.

Near-field-communications transceiver circuitry 44 may convey near-field communications signals over near-field communications antenna 166 via transmission line 110S. Corresponding antenna currents I1 (e.g., currents at near-field communications frequencies) may flow over the conductive loop path extending between antenna feed terminals 164 and 162. For example, antenna current I1 may flow from positive antenna feed terminal 164 over the portion of segment 176 between positive antenna feed terminal 164 and conductive structures 156, over conductive structures 156, from conductive structures 156 to conductive structures 154 over conductive layer 150 (e.g., the antenna ground for non-near-field communications antenna 172), over conductive structures 154, and then over the portion of segment 178 from conductive structures 154 to ground antenna feed terminal 162.

Capacitive circuit 160 may form an open circuit at the near-field communications frequency of antenna current I1. Antenna current I1 may therefore flow over segment 176 without being shorted to conductive layer 150 through capacitive circuit 160. This may serve to increase the overall size (area) of near-field communications antenna 166 relative to scenarios where a short circuit path is formed in place of capacitive circuit 160 (without affecting the path of antenna currents handled by non-near-field communications antenna 172 at higher non-near-field communications frequencies). Increasing the size of near-field communications antenna 166 in this way may, for example, facilitate the use of device 10 for a user who is using device 10 to communicate with external near-field communications equipment such as an RFID reader (e.g., so that the user does not have to focus on precisely placing device 10 over the RFID reader so that the antenna volume is aligned with the RFID reader).

In the example of FIG. 5, antenna current I1 may exhibit a greater strength over segment 176, conductive structures 156, and conductive layer 150 than over conductive structures 154 and segment 178 (e.g., relatively strong antenna current I1 is illustrated by a solid line in FIG. 5 whereas relatively weak current I1 is illustrated by a dashed line). This may, for example, limit the reliability of near-field communications antenna 166 when communicating with an external device such as an RFID reader held towards the left of near-field communications antenna 166 as shown in FIG. 5. If desired, near-field communications antenna 166 may be fed using differential signals to provide a more uniform antenna current across the entire area of near-field communications antenna 166.

Figure 6:
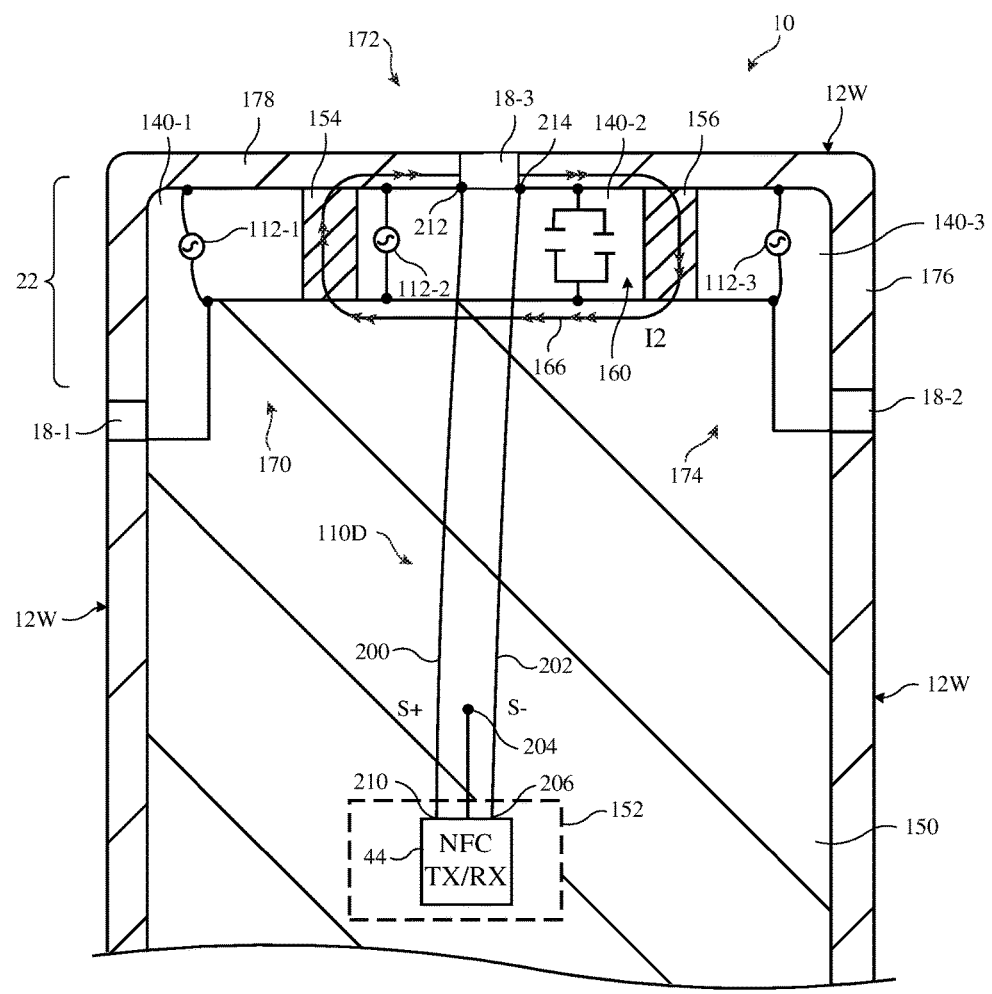
FIG. 6 is a top view of an illustrative electronic device having a slot fed using differential antenna signals for performing near-field communications in accordance with an embodiment.

FIG. 6 is a top interior view of device 10 showing how near-field communications antenna 166 may be fed using differential signals. As shown in FIG. 6, near-field communications transceiver circuitry 44 may have a differential output having terminals 210 and 206. Terminals 210 and 206 of near-field communications transceiver circuitry 44 may form a pair of differential signal terminals. Near-field communications antenna 166 may be fed using a differential pair of antenna feed terminals such as antenna feed terminals 212 and 214. Antenna feed terminal 212 (sometimes referred to herein as first differential antenna feed terminal 212) may be coupled to segment 178 of peripheral conductive housing sidewalls 12W at or adjacent to gap 18-3. Antenna feed terminal 214 (sometimes referred to herein as second differential antenna feed terminal 214) may be coupled to segment 176 of peripheral conductive housing sidewalls 12W at or adjacent to gap 18-3.

The differential output of near-field communications transceiver circuitry 44 may be coupled to near-field communications antenna 166 over transmission line 110D. Transmission line 110D may be a differential signal path (sometimes referred to herein as a differential signal transmission line). Transmission line 110D may include a first conductor 200 coupled between antenna feed terminal 212 of near-field communications antenna 166 and terminal 210 on near-field communications transceiver circuitry 44. Transmission line 110D may include a second conductor 202 coupled between antenna feed terminal 214 of near-field communications antenna 166 and terminal 206 on near-field communications transceiver circuitry 44. Near-field communications transceiver circuitry 44 may be coupled to ground via ground terminal 204.

During operation of near-field communications transceiver circuitry 44, differential signals across terminals 210 and 206 are transmitted and received by near-field communications antenna 166. The differential signals may include a differential signal pair S+/S−. Differential signal S+ of the differential signal pair may be conveyed over terminal 210, conductor 200, and antenna feed terminal 212. Differential signal S− of the differential signal pair may be conveyed over terminal 206, conductor 202, and antenna feed terminal 214. Antenna currents I2 (e.g., loop currents) corresponding to the differential signals may flow between antenna feed terminals 212 and 214 (e.g., over a conductive loop signal path formed from segment 76, conductive structures 156, conductive layer 150, conductive structures 154, and segment 178).

Feeding near-field communications antenna 166 using differential signal pair S+/S− at antenna feed terminals 212 and 214 may generate electromagnetic hotspots on either side of gap 18-3. If care is not taken, the differential signals in the differential signal pair (i.e., corresponding antenna currents) may arrive at antenna feed terminals 212 and 214 in phase with each other. Because antenna currents at antenna feed terminals 212 and 214 are conveyed in opposite directions (i.e., to the left and to the right of the page in FIG. 6, respectively), this may cause the magnetic fields associated with each differential signal to cancel out, reducing the strength of current I2 and the overall antenna efficiency of near-field communications antenna 166. In order to mitigate this cancellation, near-field communications transceiver circuitry 44 may include phase shifter circuitry that provides a phase shift to differential signals S+ and/or S− so that differential signal S+ at antenna feed terminal 212 is out of phase with respect to differential signal S− at antenna feed terminal 214 (e.g., 180 degrees out of phase or another angle between 150 degrees and 210 out of phase). Providing differential signals S+ and S− out of phase with each other in this manner may minimize magnetic field cancellations in the vicinity of gap 18-3, thereby maximizing antenna efficiency for near-field communications antenna 166. This may maximize the strength of antenna current I2 across the entire conductive loop path of near-field communications antenna 166 (e.g., so that near-field communications antenna 166 may reliably communicate with an external device such as an RFID reader held towards any part of near-field communications antenna 166).

The example of FIG. 6 in which phase shifter circuitry is formed within near-field communications transceiver circuitry 44 is merely illustrative. If desired, phase shifter circuitry may be interposed on transmission line 110D external to near-field communications transceiver circuitry 44.

Figure 7:
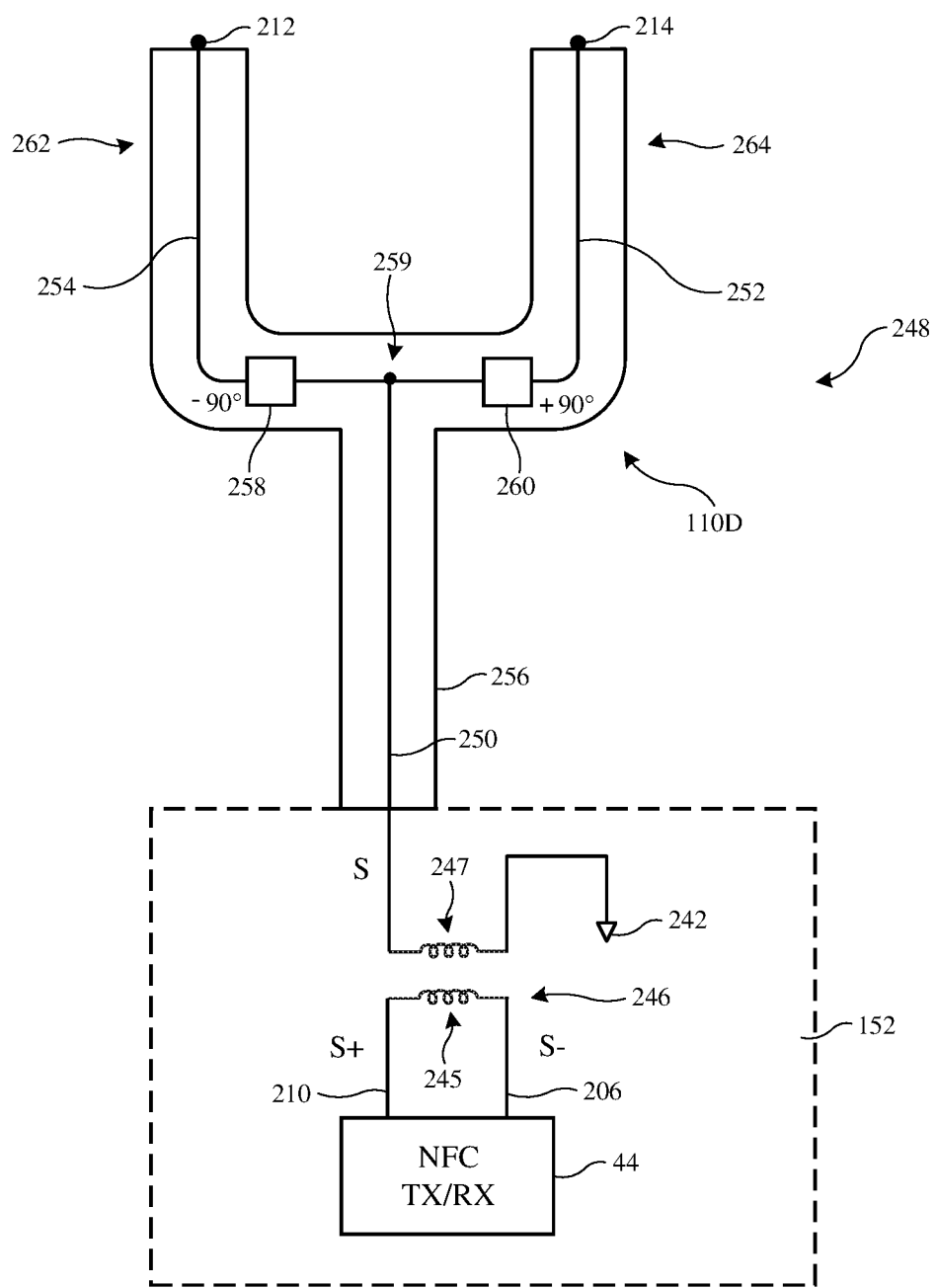
FIG. 7 is a diagram showing how phase shifter circuitry may be used to feed antenna signals for a slot of the type shown in FIGS. 6 and 7 in accordance with an embodiment.

FIG. 7 is a diagram showing how phase shifter circuitry may be interposed on transmission line 110D external to near-field communications transceiver circuitry 44. As shown in FIG. 7, near-field communications transceiver circuitry 44 may be mounted to substrate 152. Near-field communications transceiver circuitry 44 may be coupled to conductive path 110D using balun 246. Differential signal terminals 210 and 206 of near-field communications transceiver circuitry 44 may be coupled to balun 246.

Balun 246 may contain coupled inductors 245 and 247. Inductors 245 and 247 may be coupled by near-field electromagnetic coupling (i.e., inductors 245 and 247 form a transformer and are magnetically coupled). Inductor 245 may have a first terminal coupled to terminal 210 of near-field communications transceiver circuitry 44 and may have a second terminal coupled to terminal 206 of near-field communications transceiver circuitry 44. Inductor 247 may have a first terminal such as terminal 242 that is coupled to ground. Inductor 247 may also have a second terminal that is coupled to conductor 250 of conductive path 110D.

During operation of near-field communications transceiver circuitry 44, differential signals may be provided across terminals 210 and 206. Balun 246 serves as a differential-to-single-ended converter that converts differential signal pair S+/S− appearing across differential terminals 210 and 206 to single-ended signals S at conductor 250 of conductive path 110D.

Conductor 250 be coupled to node 259. Node 259 may be coupled to conductor 262 and conductor 252 (e.g., conductor 250 may branch into two separate paths at node 259). A first phase shifting circuit such as phase shifter 258 may be interposed on conductor 254. A second phase shifting circuit such as phase shifter 260 may be interposed on conductor 252. Single-ended signals S may be provided to both phase shifters 258 and 260. Phase shifter 258 may apply a first phase shift to single-ended signal S and may output the phase-shifted signal to antenna feed terminal 212 on near-field communications antenna 166 (FIG. 6). Phase shifter 260 may apply a second phase shift to single-ended signal S and may output the phase-shifted signal to antenna feed terminal 214 on near-field communications antenna 166.

The first and second phase shifts may have any desired value (e.g., where the signals at antenna feed terminal 212 are approximately 180 degrees out of phase with the signals at antenna feed terminal 214). As one example, phase shifter 258 may apply a −90 degree phase shift whereas phase shifter 260 applies a +90 degree phase shift. This example is merely illustrative and, in general, any desired phase shifts may be used. One of phase shifters 258 and 260 may be omitted if desired.

As shown in FIG. 7, conductor 250, conductor 254, conductor 252, phase shifters 258, and phase shifter 260 may be formed on a shared substrate such as flexible printed circuit 256. For example, conductor 254 and phase shifter 258 may be formed on a first branch 262 of flexible printed circuit 256 whereas conductor 252 and phase shifter 260 are formed on a second branch 264 of flexible printed circuit 256. One or more of these components may be formed on a different substrate if desired. In another suitable arrangement, one or more of these components (e.g., all of these components) may be formed on the same substrate 152 as near-field communications transceiver circuitry 44. Balun 246 is formed external to near-field communications transceiver circuitry 44. Balun 246 may be formed on substrate 152 (as shown in FIG. 7), may be formed on flexible printed circuit 256, or may be formed on a separate substrate if desired. Forming phase shifters 258 and 260 external to near-field communications transceiver circuitry 44 in this way may, for example, simplify manufacturing cost and complexity for near-field communications transceiver circuitry 44.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   a housing having a peripheral conductive wall;
   a dielectric-filled gap in the peripheral conductive wall that divides the peripheral conductive wall into first and second segments;
   an antenna ground separated from the peripheral conductive wall by a slot;
   a non-near-field communications antenna having an antenna feed coupled between the first segment and the antenna ground across the slot;
   a near-field communications antenna having a first antenna feed terminal coupled to the first segment and a second antenna feed terminal coupled to the second segment;
   a transmission line coupled to the first and second antenna feed terminals; and
   near-field communications transceiver circuitry coupled to the transmission line, wherein the near-field communications transceiver circuitry is configured to convey near-field communications signals using the near-field communications antenna.

2. The electronic device defined in claim 1, further comprising:
   non-near-field communications transceiver circuitry coupled to the antenna feed and configured to convey non-near-field communications signals using the non-near-field communications antenna.

3. The electronic device defined in claim 2, further comprising:
   an additional non-near-field communications antenna having an additional antenna feed coupled between the second segment and the antenna ground, wherein the non-near-field communications transceiver circuitry is coupled to the additional antenna feed and configured to convey the non-near-field communications signals using the additional non-near-field communications antenna.

4. The electronic device defined in claim 3, wherein the non-near-field communications transceiver circuitry is configured to concurrently convey the non-near-field communications signals over the non-near-field communications antenna and the additional non-near-field communications antenna at a given frequency using a multiple-input and multiple-output (MIMO) scheme.

5. The electronic device defined in claim 4, wherein the given frequency comprises a cellular telephone frequency between 600 MHz and 4000 MHz.

6. The electronic device defined in claim 2, further comprising:
   a first conductive structure coupled between the first segment and the antenna ground; and a second conductive structure coupled between the second segment and the antenna ground, wherein the near-field communications antenna comprises a conductive loop path that includes a portion of the first segment, a portion of the second segment, the first conductive structure, a portion of the antenna ground extending between the first and second conductive structures, and the second conductive structure, the antenna feed being coupled to the portion of the first segment.

7. The electronic device defined in claim 6, further comprising:
a capacitive circuit coupled between the portion of the second segment and the portion of the antenna ground, wherein the capacitive circuit is configured to form an open circuit at a frequency of the near-field communications signals and the capacitive circuit is configured to form a short circuit path between the portion of the second segment and the portion of the antenna ground at a frequency of the non-near-field communications signals.

8. The electronic device defined in claim 1, wherein the transmission line comprises a ground conductor coupled to the first antenna feed terminal and a signal conductor coupled to the second antenna feed terminal, the electronic device further comprising:
an inductor interposed on the signal conductor.

9. The electronic device defined in claim 1, wherein the transmission line comprises a differential signal transmission line having a first conductor coupled to the first antenna feed terminal and a second conductor coupled to the second antenna feed terminal, the near-field communications signals comprising a first differential signal of a differential signal pair conveyed over the first conductor and a second differential signal of the differential signal pair conveyed over the second conductor.

10. The electronic device defined in claim 9, wherein the first differential signal at the first antenna feed terminal is out of phase with respect to the second differential signal at the second antenna feed terminal.

11. The electronic device defined in claim 1, further comprising:
a balun that couples the near-field communications transceiver circuitry to the transmission line, wherein the transmission line comprises a first conductor coupled between a circuit node and the first antenna feed terminal, a second conductor coupled between the circuit node and the second antenna feed terminal, and a third conductor coupled between the circuit node and the balun;
a first phase shifter interposed on the first conductor; and
a second phase shifter interposed on the second conductor.

12. The electronic device defined in claim 11, wherein the first and second phase shifters are configured to apply phase shifts to the near-field communication signals that configure the near-field communications signals at the first antenna feed terminal to be out of phase with respect to the near-field communications signals at the second antenna feed terminal.

13. An electronic device comprising:
a housing having peripheral conductive structures;
first, second, and third dielectric-filled gaps in the peripheral conductive structures, wherein a first segment of the peripheral conductive structures extends between the first and third dielectric-filled gaps and a second segment of the peripheral conductive structures extends between the third and second dielectric-filled gaps;
an antenna ground, wherein the first dielectric-filled gap separates the first segment from the antenna ground and the second dielectric-filled gap separates the second segment from the antenna ground;
a transmission line having a first conductor coupled to a first antenna feed terminal on the first segment and a second conductor coupled to a second antenna feed terminal on the second segment; and
near-field communications transceiver circuitry coupled to the transmission line and configured to convey near-field communications signals over a conductive loop path that extends from the first antenna feed terminal to the second antenna feed terminal and that includes a portion of the first segment, a portion of the second segment, and a portion of the antenna ground.

14. The electronic device defined in claim 13, further comprising:
a first conductive structure coupled between the first segment and the antenna ground, wherein the portion of the first segment extends from the first conductive structure to the first antenna feed terminal and the conductive loop path includes the first conductive structure.

15. The electronic device defined in claim 14, further comprising:
a second conductive structure coupled between the second segment and the antenna ground, wherein the portion of the second segment extends from the second antenna feed terminal to the second conductive structure, the portion of the antenna ground extends between the first and second conductive structures, and the conductive loop path includes the second conductive structure.

16. The electronic device defined in claim 15, further comprising:
a camera module, wherein the camera module comprises the second conductive structure.

17. The electronic device defined in claim 15, further comprising:
phase shifter circuitry configured to apply a phase shift to the near-field communications signals, wherein the phase shift configures the near-field communications signals at the first antenna feed terminal to be out of phase with respect to the near-field communications signals at the second antenna feed terminal.

18. The electronic device defined in claim 15, further comprising:
an antenna feed coupled between the portion of the first segment and the portion of the antenna ground;
an additional transmission line coupled to the antenna feed; and
non-near-field communications transceiver circuitry coupled to the additional transmission line, wherein the non-near-field communications circuitry is configured to convey non-near-field communications signals at a higher frequency than the near-field communications signal using an antenna that includes the portion of the first segment, the first conductive structures, the portion of the antenna ground, and the antenna feed.

19. An electronic device comprising:
conductive structures;
first, second, and third slots in the conductive structures, wherein a first portion of the conductive structures separates the first slot from the second slot and a second portion of the conductive structures separates the second slot from the third slot;
a first antenna feed for a first non-near-field communications antenna coupled across the first slot;

a second antenna feed for a second non-near-field communications antenna coupled across the second slot;

a third antenna feed for a third non-near-field communications antenna coupled across the third slot;

non-near-field communications transceiver circuitry coupled to the first, second, and third antenna feeds and configured to convey non-near-field signals using the first, second, and third non-near-field communications antennas; and near-field communications transceiver circuitry coupled to first and second antenna feed terminals on the conductive structures, wherein the near-field communications transceiver circuitry is configured to convey near-field communications signals over a conductive loop path that extends around the second slot and includes the first and second portions of the conductive structures.

20. The electronic device defined in claim 19, wherein the second slot comprises an open slot having an open end and the first and second antenna feed terminals are coupled to the conductive structures at opposing sides of the open end of the open slot.

* * * * *